United States Patent
Sonnier

(10) Patent No.: US 8,925,969 B2
(45) Date of Patent: Jan. 6, 2015

(54) PIPE FLANGE LEAKAGE SPRAY SHIELD DEVICE HAVING OVER-CENTER LOCKING MECHANISM

(76) Inventor: Dwayne D. Sonnier, Carencro, LA (US)

(*) Notice: Subject to any disclaimer, the term of this patent is extended or adjusted under 35 U.S.C. 154(b) by 26 days.

(21) Appl. No.: 12/803,501

(22) Filed: Jun. 29, 2010

(65) Prior Publication Data

US 2013/0038050 A1    Feb. 14, 2013

Related U.S. Application Data

(60) Provisional application No. 61/269,872, filed on Jun. 30, 2009.

(51) Int. Cl.
*F16L 33/12* (2006.01)
*F16L 23/00* (2006.01)

(52) U.S. Cl.
CPC ................................ *F16L 23/003* (2013.01)
USPC ................ 285/88; 285/55; 285/82; 285/91; 285/252; 285/420

(58) Field of Classification Search
USPC ........... 285/13, 45, 47, 55, 81–82, 85, 87–88, 285/90–91, 252, 254, 365, 407, 420
See application file for complete search history.

(56) References Cited

U.S. PATENT DOCUMENTS

| | | | |
|---|---|---|---|
| 1,255,023 A | 1/1918 | Lang | |
| 1,510,483 A | 10/1924 | Lang | |
| 1,896,225 A | 2/1933 | Dyer | |
| 2,271,549 A | 2/1942 | Henderson | |
| 2,704,677 A * | 3/1955 | Quest | 285/5 |
| 2,804,095 A * | 8/1957 | Schauenburg | 138/107 |
| 2,944,839 A | 7/1960 | Anderson | |
| 3,100,658 A | 8/1963 | Miller et al. | |
| 3,113,790 A | 12/1963 | Matthiessen | |
| 3,850,451 A | 11/1974 | Matthiessen | |
| 4,008,937 A * | 2/1977 | Filippi | 439/192 |
| 4,216,980 A | 8/1980 | Shreve | |
| 4,320,910 A | 3/1982 | Leasher et al. | |
| 4,438,958 A * | 3/1984 | De Cenzo | 285/234 |
| 4,483,554 A | 11/1984 | Ernst | |
| 4,615,543 A | 10/1986 | Cannon | |
| 4,660,870 A * | 4/1987 | Donley | 285/419 |
| 4,924,913 A * | 5/1990 | Pedersen | 138/155 |

(Continued)

OTHER PUBLICATIONS

Spray Control Brochure of BETEK Sicherheitstechnik GmbH.

(Continued)

*Primary Examiner* — Aaron Dunwoody
*Assistant Examiner* — Fannie Kee
(74) *Attorney, Agent, or Firm* — James L. Jackson

(57) ABSTRACT

A spray shield for the pipe connection flange of pipes carrying hazardous fluids. A band composed of metal or other suitable material encompasses a pipe flange and supports a spray diffusion mesh or device so that any spray of pressurized leaked fluid is coalesced to drops or streams of leaked fluid which descend by gravity for collection rather than being sprayed into the environment in the vicinity of the leaking flange joint. The spray shield band is secured about the flange by an over-center latch mechanism that tightens the band and spray diffusion mesh around the flange connection. A locking pin or lockout device is inserted through aligned holes of the latch mechanism when closed and functions to secure the latch against release and movement from its latched position.

15 Claims, 2 Drawing Sheets

(56) References Cited

U.S. PATENT DOCUMENTS

| | | |
|---|---|---|
| 5,470,110 A | 11/1995 | Hupe |
| 5,489,124 A | 2/1996 | Nee et al. |
| 5,586,367 A * | 12/1996 | Benoit ........................ 24/68 SK |
| 5,927,760 A | 7/1999 | Rocha |
| 5,957,503 A | 9/1999 | Brown |
| 6,113,152 A | 9/2000 | Brenning |
| 6,402,201 B1 | 6/2002 | Pool et al. |
| 7,628,428 B2 | 12/2009 | Rampton |

OTHER PUBLICATIONS

Safe-ring brochure of System Ernst, Industrie-Anlagen-Technik, Kronberger Str. 3A, D-63110 Rodgau: Germany, Apr. 2002.

* cited by examiner

PIPE FLANGE LEAKAGE SPRAY SHIELD DEVICE HAVING OVER-CENTER LOCKING MECHANISM

RELATED PROVISIONAL APPLICATION

Applicant hereby claims the benefit of U.S. Provisional Patent Application No. 61/269,872, filed on Jun. 30, 2009 by Dwayne D. Sonnier and entitled "Pipe Flange Leakage Spray Shield Device Having Over-center Locking mechanism".

BACKGROUND OF THE INVENTION

1. Field of the Invention

The present invention relates generally to safety devices for preventing or minimizing the potential for leaking pipe flanges of pressurized piping systems to spray leaked fluid into the environment surrounding a particular flange connection of a piping system. More particularly, the present invention concerns a pipe flange spray shield mechanism that is secured and latched about a pipe flange so that, in the event leakage of the flange should develop, the leaked fluid will not be permitted to spray into the atmosphere and into the environment near the leaking flange connection. More specifically, the present invention concerns a mechanism for securely latching a pipe flange spray shield about a pipe flange connection and locking the latch mechanism to prevent its inadvertent release and opening.

2. Description of the Prior Art

Spray shields have been used for a number of years to protect workers and equipment from the hazardous effects of pipe flange leakage as evidenced by technical information that has been published by BETEK Sicherheitstechnik GmbH and sold in stainless steel and polypropylene materials by Industrie-Anlagen-Technik, Kronberger Strasse 3A, D-63110 Rodgau/Germany under the registered trademarks "Spray Control®" and "Safe-ring®", www.safe-ring.com. The spray shield of Industrie-Anlagen-Technik is basically wrapped around a pipe flange joint and is tightened and latched by an over-center latch mechanism. The spray shield device is lined with a pad of metal or polymer mesh material that serves to capture liquid droplets being sprayed from a leaking flange joint and to cause the droplets to coalesce to form liquid drops that in turn flow through the interstices of the mesh material and exit the spray shield in the form of drops or a stream that descends by gravity to a leakage collector.

It is known that leaking flange joints can be subjected to fluid induced forces that tend to urge the shield away from the outer circumference of the pipe flange joint so that the leakage rate can be higher than might be expected. And if the shield has become loosened, such as by the effects of temperature change the shield may have a tendency to separate from the flange. The shield can be subject to vibration by the leaking fluid to the point that the latch mechanism can be caused to release from its tightened condition about the joined flanges, thus permitting the shield to become displaced from the flange. It is desirable therefore, to provide a flange spray shield device having means for positively locking a spray shield in tightly fitting relation about a pipe flange joint to prevent the possibility of the spray shield becoming separated from the flange joint or becoming loose and resulting in ineffective and excessive fluid spray in the event of flange joint leakage.

A spray shield that has been assembled about a pipe flange joint can be struck by workers or by tools or other equipment being used by workers or can be hit by unauthorized persons, causing a conventional latch mechanism to become unlatched and resulting in separation of the spray shield mechanism from a flange joint of a pipe system. If this should occur, in the event of pipe joint leakage the typically pressurized leaked fluid will be sprayed and the resulting spray can cover a large area surrounding the leaking pipe joint. The leaking spray, especially if particularly hazardous material is being handled by the pipe system, can result in a dangerous or hazardous condition for workers and other personnel in the immediate area and can contaminate the surrounding environment, perhaps requiring significant cleanup expense. It is desirable, therefore, to provide a spray shield system that will not tend to become unlatched and separated from pipe flanges in the event of contact by other objects. And it is most important to ensure protection of workers and the environment from significant hazards in the event a flanged pipe joint should begin to leak.

At times, for various kinds of flow control equipment, it is desirable to lock a releasable latch mechanism to prevent the latch mechanism from being released. At times, lockout devices will be employed for flange spray shields to provide a means for detecting unauthorized release and opening of spray shield devices. This "lock-out" feature is often provided for security reasons to ensure against tampering when the flow control equipment or other apparatus is left unattended for a period of time. A latch mechanism can be provided with a locking feature to ensure that the latch will not be inadvertently opened in the event the equipment should be unintentionally struck by other equipment or personnel that might be conducting activities in the immediate vicinity. Accordingly, it is desired to provide a flange joint leakage spray shield system that can be present around pipe flange joints to ensure against hazardous fluid spraying in the event of joint leakage and which is provided with a latch mechanism incorporating a locking feature to permit the latch mechanism to be temporarily locked against inadvertent or unauthorized release and opening.

SUMMARY OF THE INVENTION

It is a primary feature of the present invention to provide a novel spray shield device for assembly about connected pipe flanges, the device being latched and locked by a locking pin or lockout device received within aligned lock openings to minimize the potential for the shield device becoming loose during use and becoming separated from the connected pipe flanges.

It is another feature of the present invention to provide a novel pipe flange spray shield that is capable of being adjusted to fit a particular range of pipe flange sizes and is capable of being locked at any selected or adjusted position thereof.

It is also a feature of the present invention to provide a novel spray shield device for pipe flanges that can be composed of a wide variety of materials to suit the service needs of a particular pipe flange material and product flowing under pressure through a piping system.

Briefly, the various objects and features of the present invention are realized by a spray shield for the pipe connection flanges of pipes carrying hazardous fluids, to ensure against spraying of the pressurized fluids in the event of leakage of the seal between the pipe flanges. A spray shield band composed of metal, polymer or other suitable material encompasses a pipe flange and supports a spray diffusion mesh or device between the spray shield band and a flanged joint. Any spray of pressurized leaked fluid from the flanged joint is coalesced or converted to form liquid drops or consolidated streams of leaked fluid that descend from the spray shield assembly by gravity rather than being sprayed into the environment in the vicinity of the leaking flange seal. The leaked fluid can be easily collected for recovery or disposal rather than representing a hazard to workers and the environment.

The spray shield band is tightened and secured about the adjacent flanges of the flange joint by an over-center latch mechanism that tightens the band and the spray diffusion mesh or device around the flange connection. The latch mechanism has multiple latched positions or is selectively adjustable to ensure controlled tightening of the spray shield band assembly about the flange connection. The latch base and the pivotal latch member each define locking holes that are positioned in aligned registry when the latch mechanism has been moved to its latched position. A locking pin or other lock-out device is inserted through the aligned locking holes of the latch mechanism and functions to secure the latch mechanism at its latched position. A retainer member such as a cotter key or mechanical lock is positioned within a hole in the locking pin or lock-out device to ensure that the locking pin remains in place until such time as the latch mechanism is intentionally opened. The spray shield can be removed from the flanges of the flange joint only by first removing the retainer member and the locking pin and then manipulating the over-center latch member in a direction causing release and opening of the latch mechanism.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration of a pipe flange spray shield device embodying the principles of the present invention and showing the spray shield device in its closed and latched condition;

FIG. 2 is a sectional view showing the pipe flange spray shield device of FIG. 1 being shown in its closed, tightened and latched position about the outer peripheries of a spaced pair of pipe flanges;

FIG. 3 is a side elevation view showing the unlatched and open position of the pipe flange spray shield device of FIGS. 1 and 2; and FIG. 4 is a partial plan view having parts there illustrated in section and showing the latch mechanism in its latched and locked condition and with its locking pin secured in place.

DETAILED DESCRIPTION OF PREFERRED EMBODIMENT

Figure 1:
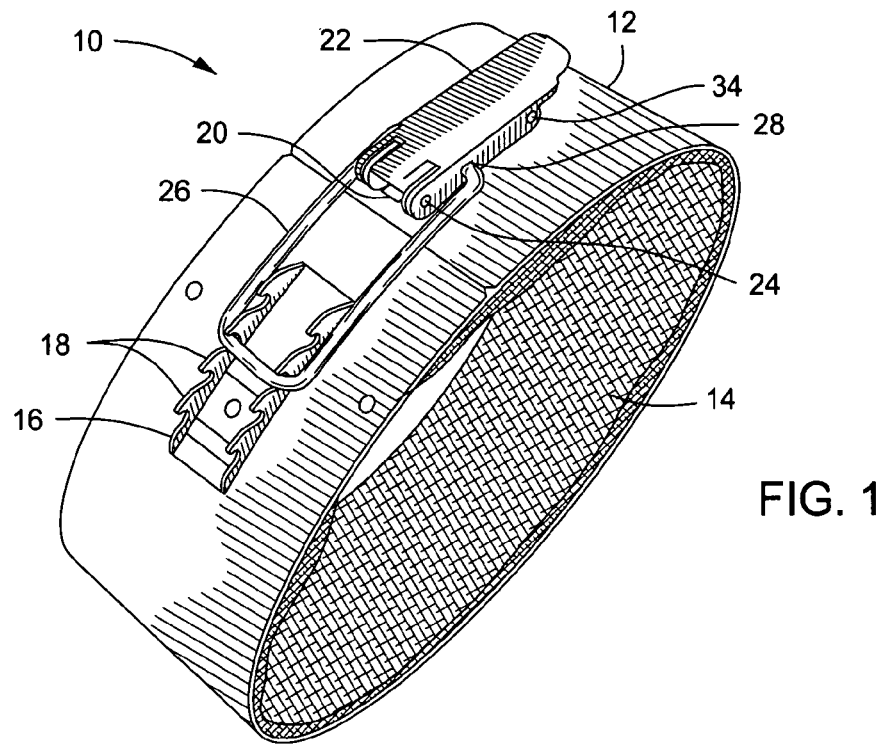

Referring now to the drawings and first to FIG. 1, a spray shield mechanism is shown in isometric illustration generally at 10 and comprises a spray shield band member 12 composed of metal, such as stainless steel, or being composed of any of a number of other metal or polymer materials that are consistent with the character of flow controlling service of a fluid handling flow line. The spray shield band member 12 defines an inner surface 13, best shown in FIG. 2 and typically has a width of about two inches, though it can have any suitable width within the spirit and scope of the present invention to cover the adjacent assembled flanges of a pipe joint having flanges and having a seal between the flanges. The flanged joint may be defined by the flanges of a valve mechanism to which pipe flanges are secured, typically by means of bolts or by means of stud and nut assemblies.

Figure 2:
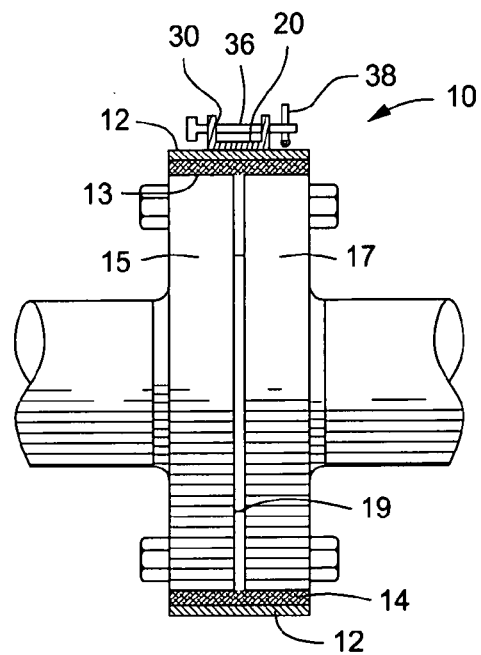

Within the spray shield band 12 is provided a desired layer or pad of metal mesh or netting 14, being composed of a material such as stainless steel and being of sufficient length and width to cover substantially the entirety of the inner surface 13 of the spray shield band member 12. The length of the layer or pad of metal mesh or netting material 14 is substantially the length of said spray shield band member 12, enabling the spray shield band member and the pad of metal netting material to be wrapped completely around the outer peripheries of an assembled pair of pipe flanges 15 and 17 that are joined and sealed by a flange seal member 19, such as is illustrated in FIG. 2. If desired, the mesh or netting layer or pad 14 may be composed of a polymer material or any other material that is suitable for the service conditions that are expected and it may be defined by any material that constitutes a multitude of random interstices that define a multitude of spray droplet catching and coalescing structures.

The purpose of the layer or pad of netting material 14 is to intercept the pressure induced spray particles of fluid that typically emerge from a flanged pipe joint that begins to leak and to cause the spray particles to be coalesced or merged into drops and ultimately to form drops that propagate through the mesh material and descend by gravity from the shielded flange assembly. In the event of substantial leakage the drops coalesce into one or more flow streams that drain by gravity from the spray shield for safe collection rather than spraying into the surrounding environment. If the fluid material being handled by the pipe line is caustic, erosive, corrosive or hazardous to the health of workers in the area, the leaked fluid will simply descend from between the flanges and spray shield through the pad of mesh or netting material 14 by gravity, where it can be collected and secured, rather than being permitted to spray over a large area that might be inhabited by workers.

To one end portion of the spray shield band 12 is mounted or provided a catch device 16 having a plurality of spaced teeth 18, with catch spaces between the teeth. If desired, the catch device 16 may simply be formed from the wall structure of the spray shield band 12 or it may be in the form of a separate catch member that is mounted to the outer surface of the spray shield band essentially as shown in FIG. 1. The catch device 16 may be mounted to the spray shield band 12 by means of rivets, screws or other fasteners or by means of welding.

Figure 3:
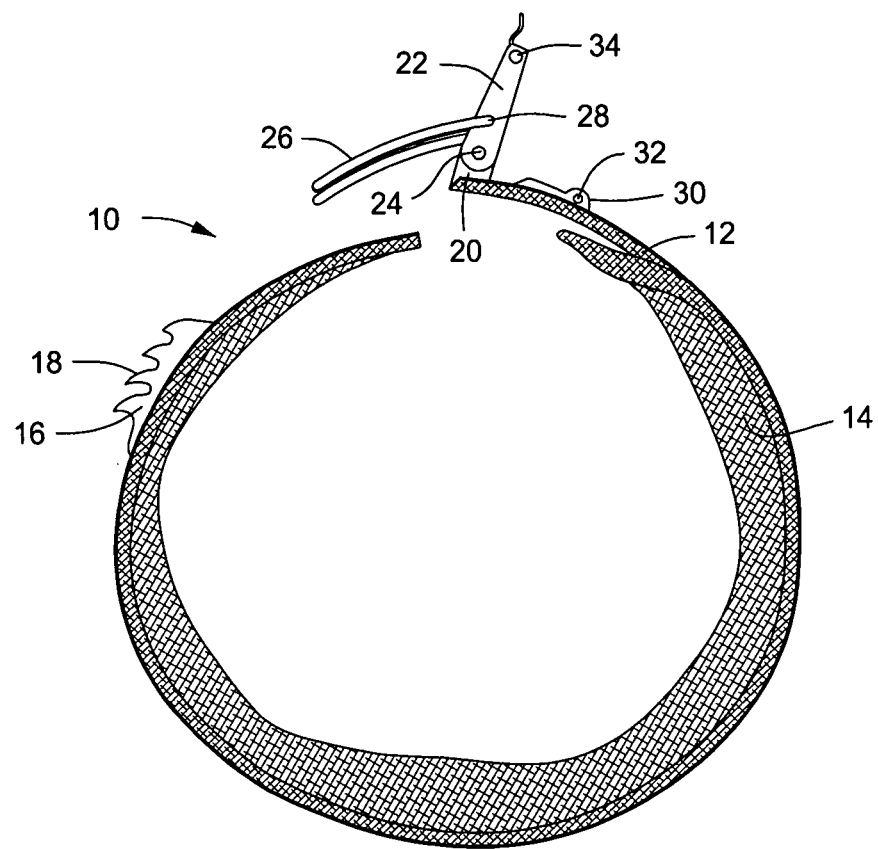
Figure 4:
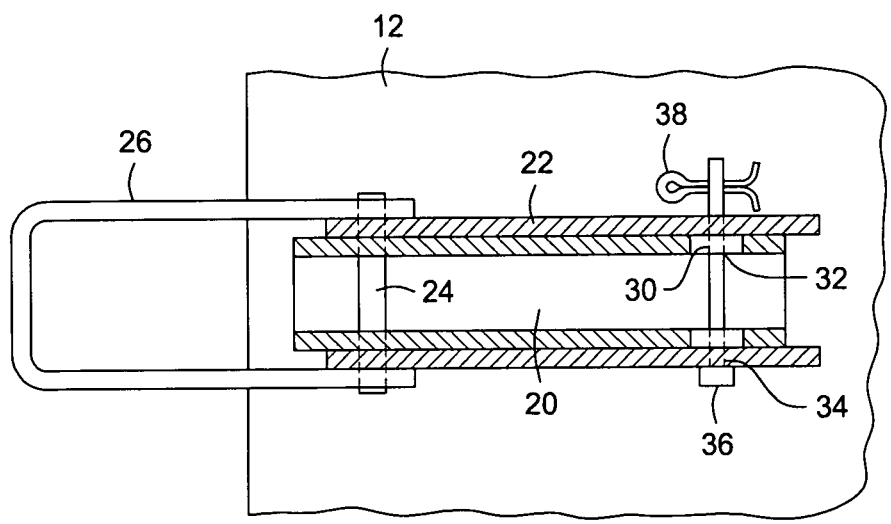

A latch base member 20 is mounted to the opposite end portion of the spray shield band 12. A pivotal latch member 22 is mounted to the latch base member 20 by a pivot pin 24 and has a catch engaging member 26 pivotally mounted to holes 28 in the pivotal latch member 22. The latch base member 20 may include upstanding spaced enlargements 30 each defining locking holes 32 as illustrated in FIG. 3. As is evident from FIG. 1, the latch and latch base members may each be of sufficient dimension to define the locking holes 32. The pivotal latch member 22 defines locking holes 34 that are positioned in registry with the locking holes 32 when the pivotal latch member 22 has been pivotally moved to its locking position. The catch engaging member 26 is in the form of a bail, as shown in FIG. 4, or strap having a portion that engages within a selected one of the catch spaces between the latch teeth 18. If the catch engaging member 26 is in the form of a strap member it may have a hooked end that enters within the spaces between the teeth and engages selected ones of the teeth members.

Pivotal movement of the pivotal latch member 22 causes tightening movement of the catch engaging member 26 thus drawing the spray shield band 12 to desired tightness about the flanges of the pipe joint and somewhat compressing the layer or pad of mesh or netting material 14 so that the spray shield band 12 and the pad of mesh material will remain in place and will not be displaced in the event the flange joint should begin to leak by failure of its seal or erosion of the seal groove within which the annular seal member is located. The pivotal latch member 22 functions as an over-center toggle to tighten the spray shield band and mesh layer or pad about the joined pipe flanges as the pivotal latch member is rotated to its latched position about the pivot pin 24. A locking pin 36, shown in FIG. 2, is then positioned through the aligned and registered locking holes 32 and 34 to maintain the spray shield assembly securely about the joined pipe flanges. The locking pin may be a part of a lockout device if desired. It is necessary, however, to ensure against compression of the mesh material to the point that it loses some of its spray coalescing capability. With experience, workers are quickly able to determine the spray band tightness that is needed for optimum results.

When pipe moving conditions occur, such as vibration, expansion and contraction by thermal heating and cooling or when workers are moving the pipe or contacting it with tools and other equipment during servicing, the locking pin arrangement prevents the spray shield device from becoming inadvertently loosened. The latch mechanism is positively retained in its latched condition by the locking pin and cannot become inadvertently unlatched and opened without first removing the locking pin. For additional safety, the locking pin defines a hole through which is inserted a cotter key 38 lock member or other positive retaining device to prevent the locking pin from being removed and thus further preventing inadvertent unlatching and opening of the spray shield device 10.

It is also intended that the present invention have application to a wide range of devices that are used in the control of flowing fluid. Thus, it is not intended to restrict the spirit and scope of the present invention to use in connection with the specific spray shield device that is shown in the drawing or to use the spray shield device only for sealing flanged pipe joints. The discussion here, for purposes of simplicity, is intended only to be representative of a preferred embodiment of the present invention. Other and further embodiments of the present invention will become obvious and inherent to one skilled in the art upon a thorough understanding of the spirit and scope of the present invention.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A spray shield mechanism for placement about connected flanges of flanged pipe joints for collecting and coalescing any liquid spray leaking from the flanged pipe joints, comprising:
   a spray shield band defining first and second end portions and defining an inner surface and an outer surface;
   an annular body of porous material substantially covering said inner surface of said spray shield band and serving to coalesce liquid spray particles leaked from the flanged pipe joints into drops and streams that descend by gravity from said annular body of porous material;
   a catch member being provided at said first end portion of said spray shield band;
   a latch base being mounted to said second end portion of said spray shield band and defining a latch pivot support;
   a latch member being pivotally mounted to said latch base between an open position permitting release and opening of said spray shield mechanism and a closed position where said spray shield mechanism is tightened and secured about the flanged pipe joints, said latch member having a catch engaging member disposed for selective retaining engagement with said catch member and defining a first locking hole;
   said latch base defining a second locking hole being disposed in alignment with said first locking hole when said latch member is located at said closed position thereof; and
   a locking member being extended through said first and second locking holes when said latch member is located at said closed position and securing said latch member against movement from said closed position and being removed from said first and second locking holes to permit opening movement of said latch member; and
   a cotter key being engaged with said locking member to prevent separation of said locking member from said first and second locking holes and being removed from said locking member to permit separation of said locking member from said first and second locking holes.

2. The spray shield mechanism of claim 1, comprising:
   said spray shield band being composed of a metal material;
   said catch member being composed of a metal material; and
   said latch base being composed of a metal material fixed to said spray shield band.

3. The spray shield mechanism of claim 1, comprising:
   said spray shield band being composed of a polymer material.

4. The spray shield mechanism of claim 1, comprising:
   said annular body of porous material being composed of a metal mesh material substantially completely lining said inner surface of said spray shield band.

5. The spray shield mechanism of claim 1, comprising:
   said annular body of porous material being composed of a polymer material.

6. A spray shield mechanism for placement about connected flanges of flanged pipe joints for collecting and coalescing any liquid spray leaking from the flanged pipe joints, comprising:
   a spray shield band defining first and second end portions and defining an inner surface and an outer surface;
   an annular body of porous material substantially covering said inner surface of said spray shield band and serving to coalesce liquid spray particles leaked from the flanged pipe joints into drops and streams that descend by gravity from said annular body of porous material;
   a catch member being provided at said first end portion of said spray shield band;

a latch base being mounted to said second end portion of said spray shield band and defining a latch pivot support;

a latch member being pivotally mounted to said latch base between an open position permitting release and opening of said spray shield mechanism and a closed position where said spray shield mechanism is tightened and secured about the flanged pipe joints, said latch member having a catch engaging member disposed for selective retaining engagement with said catch member, said latch member having a side member defining a first locking hole;

said latch base having a side member defining a second locking hole being disposed in alignment with said first locking hole when said latch member is located at said closed position;

a locking pin being extended through said first and second locking holes to positively restrain said latch member from opening movement and being removed from said first and second locking holes to permit pivotal movement of said latch member from said closed position toward said open position; and a cotter key being engaged with said locking pin to prevent separation of said locking pin from said first and second locking holes and being removed from said locking pin to permit separation of said locking pin from said first and second locking holes.

7. The spray shield mechanism of claim 6, comprising:
said locking pin defining a retainer hole; and
said cotter key extending through said retainer hole.

8. The spray shield mechanism of claim 7, comprising:
said catch engaging member being a bail structure pivotally mounted to said latch member and having a portion disposed for engagement with a tooth of said catch member.

9. A spray shield mechanism for placement about connected flanges of pipe flange joints for collecting and coalescing any liquid spray leaking therefrom, comprising:

a spray shield band defining first and second end portions and defining an inner surface and an outer surface;

an annular body of porous material substantially covering said inner surface of said spray shield band and causing coalescence of leaked liquid spray particles into drops and streams that descend by gravity from said annular body of porous material and said spray shield band;

a catch member being provided at said first end portion of said spray shield band and defining a latch tooth;

a latch base being mounted to said second end portion of said spray shield band and defining a latch pivot support and a locking pin support having a first locking hole;

a latch member being pivotally mounted to said latch base and being pivotally moveable between an open position permitting release and opening of said spray shield mechanism and a closed position where said spray shield mechanism is tightened and secured about the pipe flange joints, said latch member having a catch engaging member disposed for selective retaining engagement with said latch tooth of said catch member and defining a second locking hole positioned in alignment with said first locking hole of said latch base when said latch member is located at said closed position;

a locking pin member being extended through said first and second locking holes when said latch member is located at said closed position to secure said latch member at said closed position and being removed to permit opening movement of said latch member; and a cotter key releasably engaging said locking pin member and securing said locking pin member against movement from said first and second locking holes of said latch base and said latch member.

10. The spray shield mechanism of claim 9, comprising:
said spray shield band being composed of a metal material;
said catch member device being composed of a metal material fixed to said spray shield band; and
said latch base being composed of a metal material fixed to said spray shield band.

11. The spray shield mechanism of claim 9, comprising:
said spray shield band being composed of a polymer material.

12. The spray shield mechanism of claim 9, comprising:
said annular body of porous material being composed of a metal mesh material.

13. The spray shield mechanism of claim 9, comprising:
said annular body of porous material being composed of a polymer material.

14. The spray shield mechanism of claim 9, comprising:
said locking pin member defining a retainer hole; and
said cotter key extending through said retainer hole.

15. The spray shield mechanism of claim 9, comprising:
said catch engaging member being a bail structure pivotally mounted to said latch member and having a portion disposed for engagement with said latch tooth of said catch member.

* * * * *